(12) United States Patent
Konishi et al.

(10) Patent No.: US 10,299,338 B2
(45) Date of Patent: May 21, 2019

(54) SENSOR DEVICE AND ILLUMINATION SYSTEM

(71) Applicant: Panasonic Intellectual Property Management Co., Ltd., Osaka (JP)

(72) Inventors: Hirofumi Konishi, Osaka (JP); Masashi Motomura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/852,973

(22) Filed: Dec. 22, 2017

(65) Prior Publication Data

US 2018/0184500 A1 Jun. 28, 2018

(30) Foreign Application Priority Data

Dec. 27, 2016 (JP) .................................. 2016-252430

(51) Int. Cl.
*H05B 33/08* (2006.01)
*H05B 37/02* (2006.01)

(52) U.S. Cl.
CPC ..... *H05B 33/0872* (2013.01); *H05B 33/0815* (2013.01); *H05B 37/0227* (2013.01); *H05B 37/0281* (2013.01); *Y02B 20/44* (2013.01)

(58) Field of Classification Search
CPC ............ H05B 33/0872; H05B 33/0815; H05B 37/0281
See application file for complete search history.

(56) References Cited

U.S. PATENT DOCUMENTS

| 2011/0037417 | A1* | 2/2011 | Mix | H05B 37/0227 315/307 |
| 2012/0098465 | A1* | 4/2012 | Rothschild | H05B 37/02 315/360 |
| 2012/0176046 | A1* | 7/2012 | Tsai | H05B 33/0851 315/185 R |
| 2013/0147366 | A1* | 6/2013 | Huizenga | H05B 37/02 315/152 |
| 2013/0181630 | A1* | 7/2013 | Taipale | H05B 37/0263 315/224 |
| 2014/0239821 | A1* | 8/2014 | Leonard | H05B 41/36 315/158 |
| 2016/0054023 | A1* | 2/2016 | Baker | E04F 19/00 307/31 |
| 2018/0177023 | A1* | 6/2018 | Li | H05B 33/0815 |

FOREIGN PATENT DOCUMENTS

JP 2005-285542 A 10/2005

* cited by examiner

*Primary Examiner* — Dedei K Hammond
*Assistant Examiner* — Raymond R Chai
(74) *Attorney, Agent, or Firm* — Renner Otto Boisselle & Sklar, LLP

(57) ABSTRACT

A sensor device according to an example of the embodiment is connected, on an input side rather than an illumination apparatus, to a main power source line of an illumination system to which a DC voltage is applied and to which the illumination apparatus is connected through a branch wire. The sensor device includes: a sensing unit that detects an object and outputs a detection signal; and a switch that is provided in the main power source line and connects or disconnects the main power source line by an on-off operation on the input side rather than the illumination apparatus. The switch is controlled to be turned on or off based on the detection signal of the sensing unit.

18 Claims, 7 Drawing Sheets

SENSOR DEVICE AND ILLUMINATION SYSTEM

CROSS REFERENCE TO RELATED APPLICATION

The entire disclosure of Japanese Patent Application No. 2016-252430 filed on Dec. 27, 2016, including specification, claims, drawings and abstract, is incorporated herein by reference in its entirety.

TECHNICAL FIELD

The present disclosure relates to a sensor device and an illumination system using the sensor device.

BACKGROUND

In JP 2005-285542 A, there is disclosed an illumination system that supplies AC power from a commercial AC power source to an illumination apparatus or the like, the system controlling the illumination apparatus based on an operation signal of an external operation unit and a detection signal of a human detection sensor. Among illumination systems with a sensor device such as a human detection sensor incorporated therein, there is known such an illumination system that supplies electric power from a DC power source instead of a commercial AC power source.

CITATION LIST

Patent Literature

Patent Literature 1 JP 2005-285542 A

SUMMARY

Technical Problem

In an illumination system using a DC power source in which a sensor device is incorporated, a mechanism is conceivable in which a detection signal of the sensor device is transmitted using a radio unit or a signal line to a master unit that controls an illumination apparatus. However, such a system has a problem of a cost increase due to the use of the radio unit, or a work burden increase due to the use of a signal line.

Solution to Problem

A sensor device according to one aspect of the present disclosure is connected to a main power source line, of an illumination system, to which a DC voltage is applied, to which a DC power source device that outputs a DC voltage is connected, and to which at least one of an illumination apparatus is connected through a branch wire, the sensor device being connected to the main power source line in between where the DC power source device is connected to the main power source line and where at least one of the illumination apparatus is connected to the main power source line through the branch wire, and the sensor device comprising: an input-side terminal to which the main power source line is connected; an output-side terminal to which the main power source line is connected; a sensing unit that detects an object and outputs a detection signal; and a switch that is provided in the main power source line and connects or disconnects the main power source line by an on-off operation, and the switch being controlled to be turned on or off based on the detection signal.

An illumination system according to one aspect of the present disclosure comprising: a DC power source device that outputs a DC voltage; a main power source line to which the DC voltage is applied; at least one of an illumination apparatus that is connected to the main power source line through a branch wire; and a sensor device that is connected to the main power source line between the DC power source device and at least one of the illumination apparatus.

Advantageous Effects of Invention

The sensor device according to one aspect of the present disclosure enables the illumination apparatus to be controlled based on detection information of the sensor device without using a radio unit and a signal line for transmitting the detection information in the illumination system using a DC power source. The radio unit and the signal line are not required, as a result of using the sensor device according to one aspect of the present disclosure, thereby making it possible to construct the illumination system at a low cost and with good workability.

BRIEF DESCRIPTION OF DRAWINGS

Embodiments of the present disclosure will be described based on the following figures, wherein.

DESCRIPTION OF EMBODIMENTS

Hereinafter, embodiments of a sensor device and an illumination system of the present disclosure will be described in detail with reference to the figures. However, the sensor device and the illumination system of the present disclosure are not limited to the embodiments described below. It is assumed that constituent elements of multiple embodiments described below are selectively combined.

Figure 1:
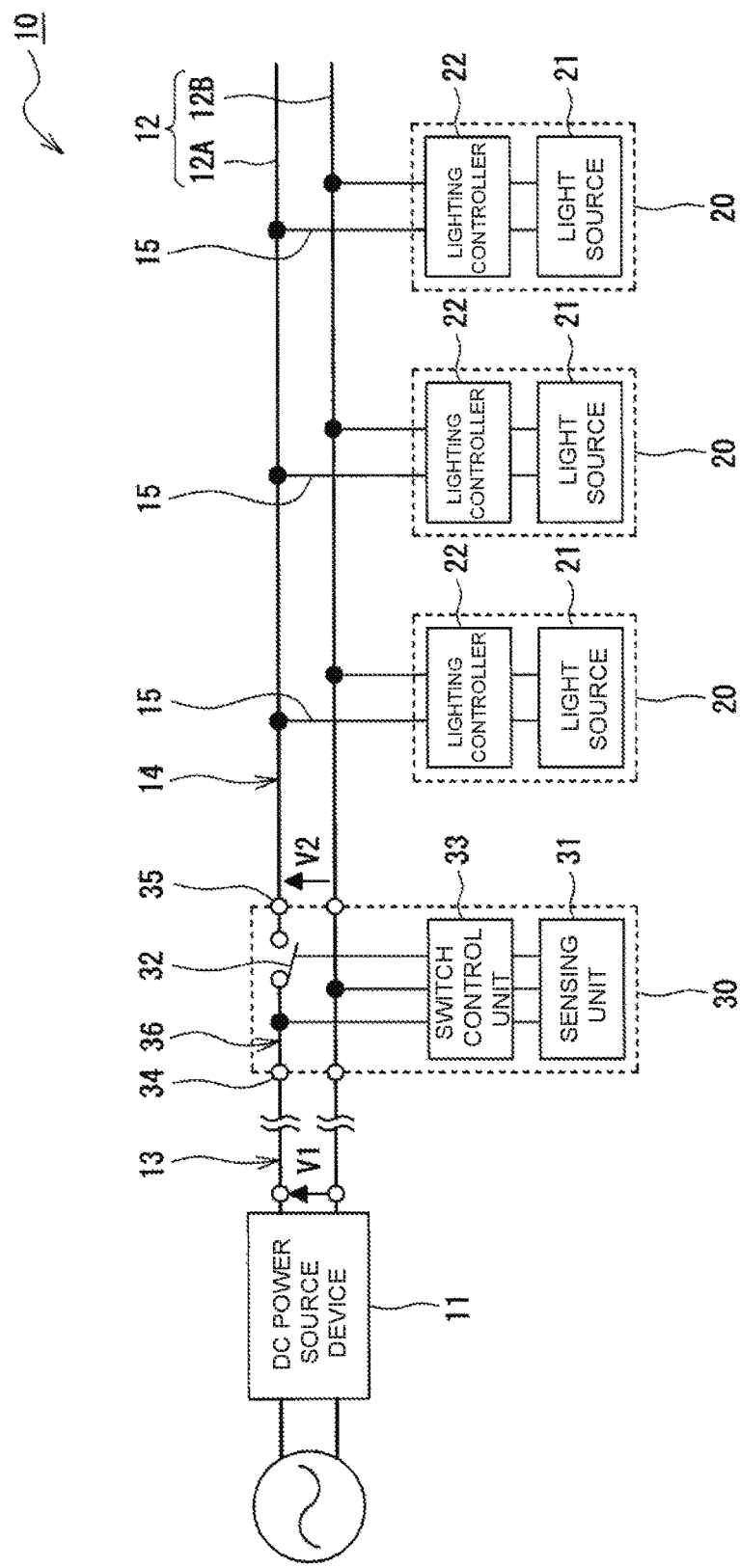
FIG. 1 is a block diagram showing an illumination system according to an example of the embodiments.

FIG. 1 is a block diagram showing a configuration of an illumination system 10 according to one embodiment. As illustrated in FIG. 1, the illumination system 10 includes a DC power source device 11 that outputs a DC voltage, a main power source line 12 to which the DC voltage is applied; an illumination apparatus 20 that is connected to the main power source line 12 through a branch wire 15; and a sensor device 30. The sensor device 30 is connected to the main power source line 12 between the DC power source device 11 and the illumination apparatus 20, and includes a switch 32 provided in the main power source line 12. In the present embodiment, a plurality of illumination apparatuses 20 are each connected to the main power source line 12 through a branch wire 15.

The illumination system 10 includes, for example, three illumination apparatuses 20, and one sensor device 30. In the example shown in FIG. 1, the one sensor device 30, and the three illumination apparatuses 20 are connected to the main power source line 12 extending from the DC power source device 11 in order from the DC power source device 11 side. In other words, all of the illumination apparatuses 20 are connected to the main power source line 12 on an output side of the sensor device 30. In this case, all of the illumination apparatuses 20 may be controlled by turning the switch 32 of the sensor device 30 on or off.

Note that the number of illumination apparatuses 20 and the number of sensor devices 30 included in the illumination system are not particularly limited to three and one, respectively. The number of illumination apparatuses 20 may be one, or four or more. When a plurality of illumination apparatuses 20 are provided, the sensor device 30 is connected to the main power source line 12 on the DC power source device 11 side rather than at least one of the illumination apparatuses 20. In other words, the illumination apparatus 20 may be connected on the power source side rather than the sensor device 30 (see FIG. 5 described later). A plurality of sensor devices 30 may be provided (see FIG. 6 described later).

The illumination apparatus 20 and the sensor device 30 included in the illumination system 10 are installed indoors such as in houses, offices, commercial establishments, or factories. In the present embodiment, it is assumed that the illumination apparatus 20 and the sensor device 30 are installed in the same area, such as the same room, or the same corridor. The DC power source device 11 may be installed at the same place as or in a difference place from the installation place of the illumination apparatus 20 and the sensor device 30. The illumination system 10 may include an operation part (not shown) for operating the illumination apparatus 20, and the DC power source device 11 may be incorporated into the operation part.

The main power source line 12 for supplying DC power to each illumination apparatus 20 through the sensor device 30 from the DC power source device 11 is constituted by a high potential side power source line 12A and a low potential side power source line 12B. The low potential side power source line 12B is preferably grounded. The main power source line 12 is a power source line for connecting multiple apparatuses including the illumination apparatuses 20 and the sensor device 30, and is different from the branch wire 15 that is a power source line connecting between the one illumination apparatus 20 and the main power source line 12 in that the main power source line 12 is a power feeding path for supplying electric power to the multiple apparatuses.

The DC power source device 11 is a device that is connected with a commercial AC power source AC, and converts an AC voltage of the AC power source AC to a DC voltage. The AC power source AC is generally connected to the DC power source device 11 through a distribution board (not shown) including a breaker. The DC power source device 11 includes, for example, an AC/DC converter, and a control circuit that controls the AC/DC converter. Note that the DC power source device 11 may be used in combination with a power storage device such as a secondary battery, or a solar cell, a fuel cell or the like that generates DC power.

The DC power source device 11 outputs a DC voltage V1 to the main power source line 12. The DC voltage V1 is 36 V, for example. The DC power supplied from the DC power source device 11 through the main power source line 12 is supplied to each of the illumination apparatuses 20 through the sensor device 30. In the present embodiment, two main power source lines 12 are each constituted by a main power source line 13 that connects the DC power source device 11 and the sensor device 30, a main power source line 14 that extends to each of the illumination apparatuses 20 from the sensor device 30; and a main power source line 36 described later.

The plurality of illumination apparatuses 20 are each connected to the main power source lines 12 through the branch wire 15 as described above. Examples of the illumination apparatus 20 include an incandescent lamp, a fluorescent lamp, an LED (light emitting diode), and the like, but the LED is particularly preferably used in the illumination system 10. The LED is not limited to an inorganic LED, and may be an organic LED (OLED). The plurality of illumination apparatuses 20 may be different from each other in type, but in the present embodiment, the same illumination apparatuses are used.

The illumination apparatus 20 generally includes a light source 21, and a lighting controller 22 for stably lighting the light source 21. When the LED is used for the illumination apparatus 20, the lighting controller 22 preferably includes a constant current circuit for keeping a current in the light source 21 constant. The light source 21 is connected to an output part of the constant current circuit so that a current flowing in the light source 21 is controlled by the constant current circuit. The illumination apparatus 20 may have a light control function using a PWM (pulse width modulation) system, for example.

The sensor device 30 detects the presence of an object in a detection area, and has a function of controlling the plurality of illumination apparatuses 20. The detection area may be appropriately changed in accordance with the type, the setting, the installation place or the like of the sensor device 30. The detection area may be the whole area where the sensor device 30 is installed, or may be a part of the whole area. The object to be detected by the sensor device 30 may serve as a trigger of the lighting of the illumination apparatus 20, and examples of the object include a human, illuminance, an abnormality such as fire, or the like. The illumination apparatus 20 is controlled based on detection information of the sensor device 30, but a control mode thereof is not limited to a lighting-on mode, and may include a flickering mode, or a lighting-off mode shifted from the lighting-on mode. The control mode of the illumination apparatus 20 will be described below in detail.

Examples of a sensing unit 31 of the sensor device 30 include a human detection sensor, an illuminance sensor, an abnormality detection sensor, and the like. The human detection sensor detects, for example, infrared rays emitted from a human body to detect the presence of the human in the detection area. The illuminance sensor obtains, for example, reflection light from a floor surface or the like in the detection area to detect brightness of the detection area. The abnormality detection sensor detects, for example, temperature rise, smoke, flame, or gas such as carbon dioxide caused by fire to detect that abnormalities such as fire have occurred in or near the detection area.

The sensor device 30 is connected, on an input side rather than the illumination apparatus 20, to the main power source lines 12 to which a DC voltage is applied and which connect the illumination apparatus 20 through the branch wire 15. The sensor device 30 includes a first terminal 34 that is an input-side terminal to which the DC voltage V1 is input, and a second terminal 35 that is an output-side terminal from which a DC voltage V2 is output. Note that when an on state of the switch 32 continues, the voltages V1 and V2 are substantially the same. In the present embodiment, the main power source line 13 and the main power source line 14 are connected to the first terminal 34 and the second terminal 35, respectively. The sensor device 30 is provided with the main power source lines 36 that connects the first terminal 34 and the second terminal 35 in the sensor device 30, and is an in-device main power source line included together with the main power source lines 13, 14 in the main power source line 12.

The sensor device 30 includes the sensing unit 31 that detects an object and outputs a detection signal, and the switch 32 that is provided in the main power source line 12 and connects or disconnects the main power source line 12 by an on-off operation on the input side rather than the illumination apparatus 20. In the present embodiment, the switch 32 is provided in the main power source line 36. The switch 32 may be provided in one of the two main power source lines 36, and is provided in the high potential side power source line 12A, for example.

The switch 32 is controlled to be turned on or off based on the detection signal of the sensing unit 31. That is, input and output sides of the high potential side power source line 12A are connected or disconnected based on the detection signal of the sensing unit 31. When the switch 32 is in the on state, the high potential side power source line 12A is brought into conduction from the DC power source device 11 to each illumination apparatus 20 so that the DC power is supplied to each illumination apparatus 20. On the other hand, when the switch 32 is in off state, the high potential side power source line 12A is disconnected in the sensor device 30, resulting in disconnecting the power supply to each illumination apparatus 20.

The on/off control of the switch 32 is performed by a switch control unit 33. The sensing unit 31, the switch 32, and the switch control unit 33 are preferably integrally incorporated in the same case (not shown) constituting the sensor device 30. The sensing unit 31, the switch 32, and the switch control unit 33 are integrated, thereby improving the workability of the sensor device 30. However, the switch 32 may be separately provided in the main power source line 13, for example.

Figure 2:
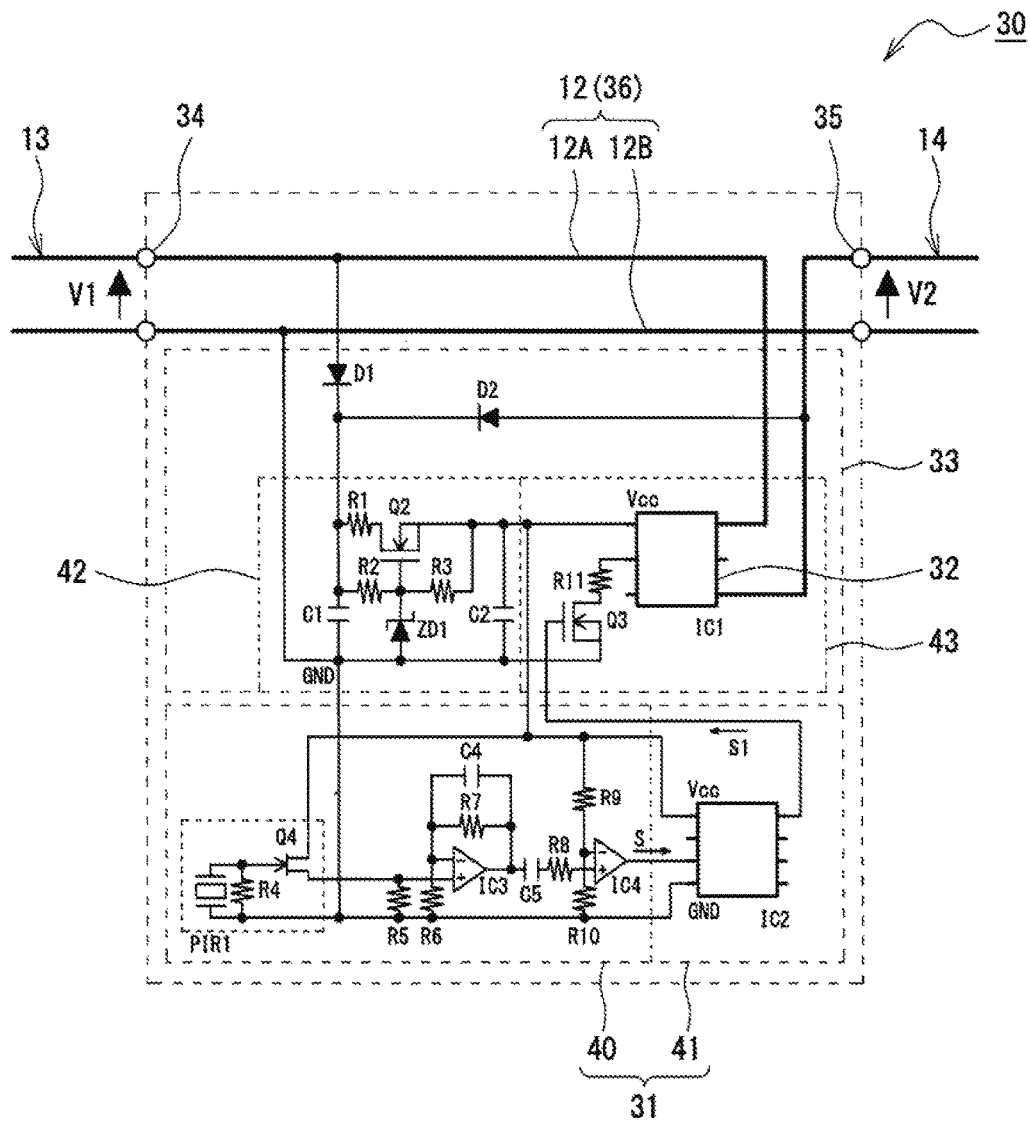
FIG. 2 is a circuit diagram of a sensor device according to an example of the embodiments.

Here, a configuration of the sensor device 30 will be further described in detail with reference to FIG. 2. FIG. 2 shows an example of a circuit configuration of the sensor device 30.

As illustrated in FIG. 2, the sensing unit 31 of the sensor device 30 includes a sensor section 40 that includes a sensor element, and a control determination section 41 that outputs a signal for controlling on/off of the switch 32. The switch control unit 33 of the sensor device 30 includes a control power source section 42 and a switch drive section 43. In the example shown in FIG. 2, a photo MOS relay (IC1) mounted on the switch drive section 43 is provided in the high potential side power source line 12A of the main power source lines 36 to constitute the switch 32.

The switch control unit 33 further includes diodes (D1, D2) that connect between the high potential side power source line 12A of the main power source lines 36 and the control power source section 42. The diode (D1) is connected to the high potential side power source line 12A between the first terminal 34 and the switch 32, and the diode (D2) is connected to the high potential side power source line 12A between the switch 32 and the second terminal 35. In FIG. 2, the first terminal 34 is the input-side terminal (input part) to which the main power source line 13 is connected, and the second terminal 35 is the output-side terminal (output part) to which the main power source line 14 is connected, but the first terminal 34 and the second terminal 35 may be the output part and the input part, respectively. The sensor device 30 illustrated in FIG. 2 has no connection directionality, and therefore the sensor device 30 is used, to thereby further obtain good workability.

The control power source section 42 connected to the high potential side power source line 12A through the diodes (D1, D2) includes, for example, a zener diode (ZD1), a MOS field effect transistor (MOSFET: Q2), capacitors (C1, C2), and resistors (R1, R2, R3). The control power source section 42 generates a DC voltage of 5 V used in the switch drive section 43 from the DC voltage V1 of 36 V, for example. The generated DC voltage of 5V is also supplied to the sensing unit 31. In other words, the control power source section 42 supplies a converted DC voltage converted from the DC voltage V1 to the switch drive section 43 and the sensing unit 31. Note that the control power source section 42 may include a three-terminal regulator, a power source IC, and the like.

The switch drive section 43 to which the power is supplied from the control power source section 42 includes, for example, the photo MOS relay (IC1) constituting the switch 32, a MOSFET (Q3), and the resistor (R1). The photo MOS relay (IC1) generally incorporates an LED, a photo diode array, and the MOSFET. As described later, when the MOSFET (Q3) is driven by the detection signal (S1) of the sensing unit 31, a current flows in the LED of the photo MOS relay (IC1) so that the LED emits light. Then, the photo diode array receives the light to generate a voltage, and the voltage becomes a gate voltage to drive the MOSFET, i.e., turn on the switch 32.

The sensing unit 31 that detects an object (human) and outputs the detection signal to the control power source section 42 includes the sensor section 40 and the control determination section 41 as described above. In the example shown in FIG. 2, a pyroelectric element (PIR1) that detects infrared rays emitted from a human body is provided as a sensor element for detecting a human presence. In addition to the pyroelectric element (PIR1), an electromagnetic wave type Doppler sensor element or an image sensor element such as CCD, CMOS, or the like can be used as the sensor element for detecting a human presence. The sensor element is appropriately selected in accordance with an object to be detected.

The pyroelectric element (PIR1) generally incorporates a pyroelectric body, a resistor (R4), and a junction field effect transistor (JFET: Q4). A drain terminal of the JFET (Q4) is connected to a power source, and a gate terminal thereof is connected to the pyroelectric body. When the infrared rays enter the pyroelectric body, the pyroelectric body outputs a feeble signal so that the gate voltage of the JFET (Q4) changes. As a result, an amount of current flowing out of a source terminal changes, which causes a change in a potential difference between both terminals of a resistor (R5) connected near the source terminal, thereby detecting a change in the infrared rays resulting from the movement of the human body.

The sensor section 40 includes, for example, the above-described pyroelectric element (PIR1), the above-described resistor (R5), an operational amplifier (IC3), a comparator (IC4), resistors (R6, R7, R8, R9), and capacitors (C4, C5). In the sensor section 40, the detection signal output from the pyroelectric element (PIR1) as a voltage is amplified by the operational amplifier (IC3), and the amplified detection signal is compared with an arbitrary threshold by the comparator (IC4). When the detection signal is the threshold or more, a signal S is output from the comparator (IC4) to the control determination section 41. In other words, the sensor section 40 outputs the signal S to the control determination section 41 when detecting the human that is an object to be detected in the detection area.

The control determination section 41 to which the signal S is input from the sensor section 40 includes, for example, a microcomputer (IC2). The microcomputer (IC2) outputs a signal S1 for turning on the switch 32 to the MOSFET (Q3) of the switch drive section 43 based on the input signal S. The microcomputer (IC2), when receiving the signal S, outputs the signal S1 including, for example, shortest operation time period t1, detection delay time period t2, and the like that are described later. Alternatively, the microcomputer (IC2), when receiving the signal S, may stop the output of the signal S1 (in other words, when receiving no signal S, outputs the signal S1), or may output the signal S1 intermittently.

When the signal S1 is output from the microcomputer (IC2) of the control determination section 41, the MOSFET (Q3) is driven to thereby turn on the photo MOS relay (IC1) constituting the switch 32. The photo MOS relay (IC1) in the on state connects the input and output sides of the high potential side power source line 12A, so that the high potential side power source line 12A is brought into conduction from the DC power source device 11 to each illumination apparatus 20 to apply the DC voltage V2 to each illumination apparatus 20, which then lights up. That is, the control determination section 41, when receiving the signal S, outputs the signal S1 as the detection signal to the switch 32, and the switch 32 is in the on state while the switch 32 receives the signal S1.

Note that in the example shown in FIG. 2, the signal S1 is output from the control determination section 41 to the switch drive section 43, but the signal S of the sensor section 40 may be output as it is to the switch drive section 43.

Figure 3:
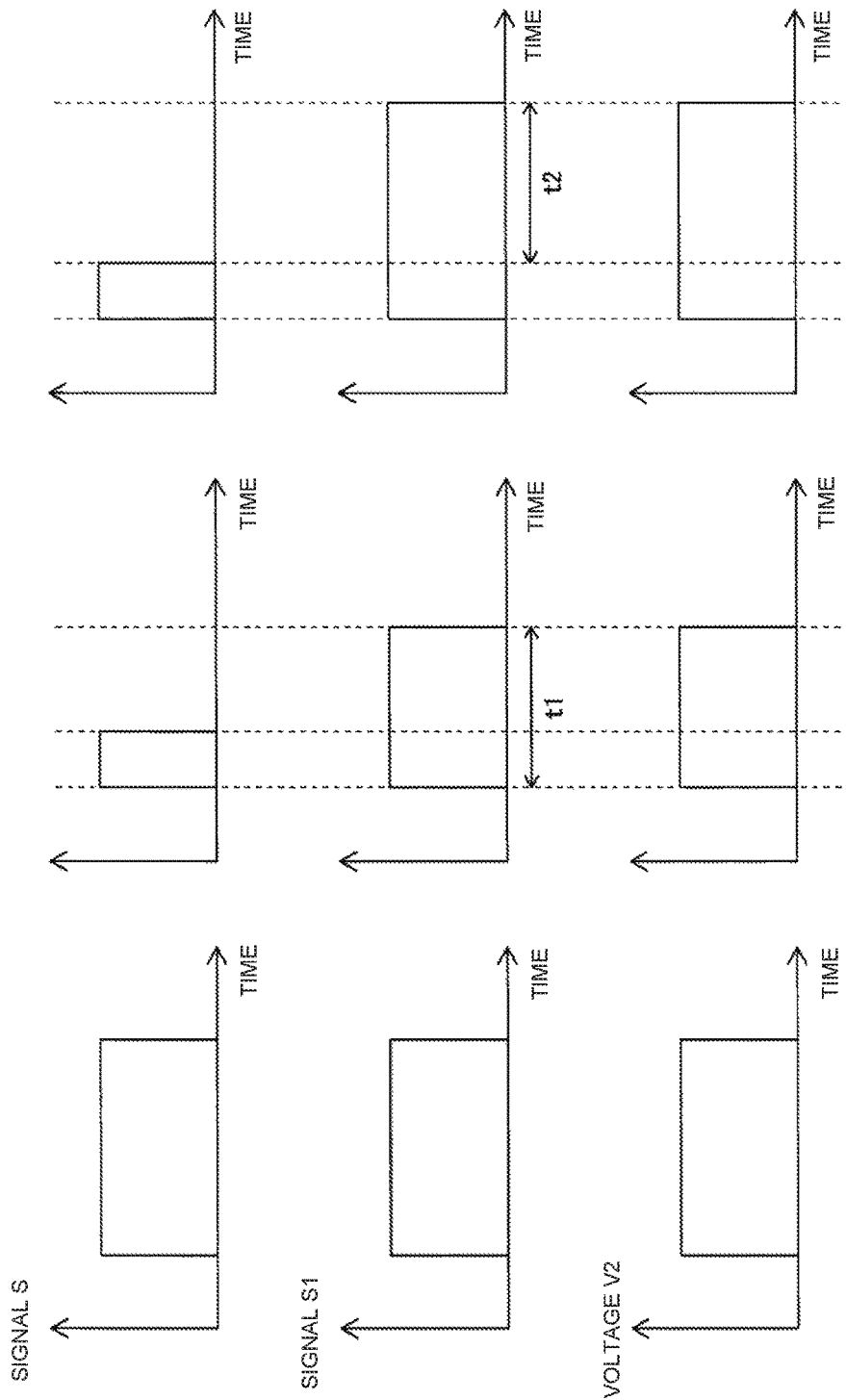
FIGS. 3(A) to 3(C) shows graphs each for explaining an example of control of an illumination apparatus in the illumination system shown in FIG. 1.

FIGS. 3(A) to 3(C) are each graphs for explaining an example of control of the illumination apparatus 20 when the human detection sensor is applied to the sensor device 30. The graphs of FIGS. 3(A) to 3(C) show relationships of the signal S output from the sensor section 40, the signal S1 output from the control determination section 41, and the voltage V2 output from the sensor device 30. FIGS. 3(A) to 3(C) each represent different control modes.

As shown in FIGS. 3(A) to 3(C), when the human detection sensor is applied to the sensor device 30, the switch 32 is in the on state at least while an object (human) is detected by the sensing unit 31, i.e., while the signal S is output. Preferably, the control determination section 41 sets the shortest operation time period t1 or the detection delay time period t2 that are described later. The control determination section 41 may set at least one of the shortest operation time period t1 and the detection delay time period t2. When a human is detected, the illumination apparatus 20 may be caused to flicker by repeatedly turning the switch 32 on and off, or may be lit off after a certain time elapses.

As shown in FIG. 3(A), the signal S is firstly output to the control determination section 41 when the human presence in the detection area is detected by the sensor section 40 of the sensing unit 31. Then, the control determination section 41 outputs the signal S1 to the switch drive section 43 to turn on the switch 32 and then output the voltage V2 from the second terminal 35. In the example shown in FIG. 3(A), the signal S1 is output while the signal S is output, i.e., while the human is detected by the sensor section 40, so that the switch 32 is turned on to light each illumination apparatus 20. When the human is not detected anymore, the sensing unit 31 stops the output of the signals S, S1 to turn off the switch 32 and then light off each illumination apparatus 20.

On the other hand, in the example shown in FIG. 3(B), when the signal S is output once from the sensor section 40, the signal S1 is output for a certain time to turn on the switch 32 and then output the voltage V2. That is, without completely matching the output states of the signals S, S1, the shortest operation time period t1 is set which is the shortest time period required to continue the output of the signal S1 from the start of the output of the signal S.

In the example shown in FIG. 3(C), even when the output of the signal S is stopped after the signal S is output once from the sensor section 40, the signal S1 is continuously output for a certain time to maintain the output voltage V2. That is, the detection delay time period t2 is set which is the shortest time period required to continue the output of the signal S1 after the output of the signal S is stopped.

When a typical pyroelectric element is used as a sensor element, a human performing a small movement may be undetected even when the human is in the detection area. Therefore, in the examples shown in FIGS. 3(B) and 3(C), the time periods t1, t2 are provided not to turn off the illumination apparatus 20 when the human is in the detection area. The time periods t1, t2 are set to several tens of seconds to several minutes, for example.

Figure 4:
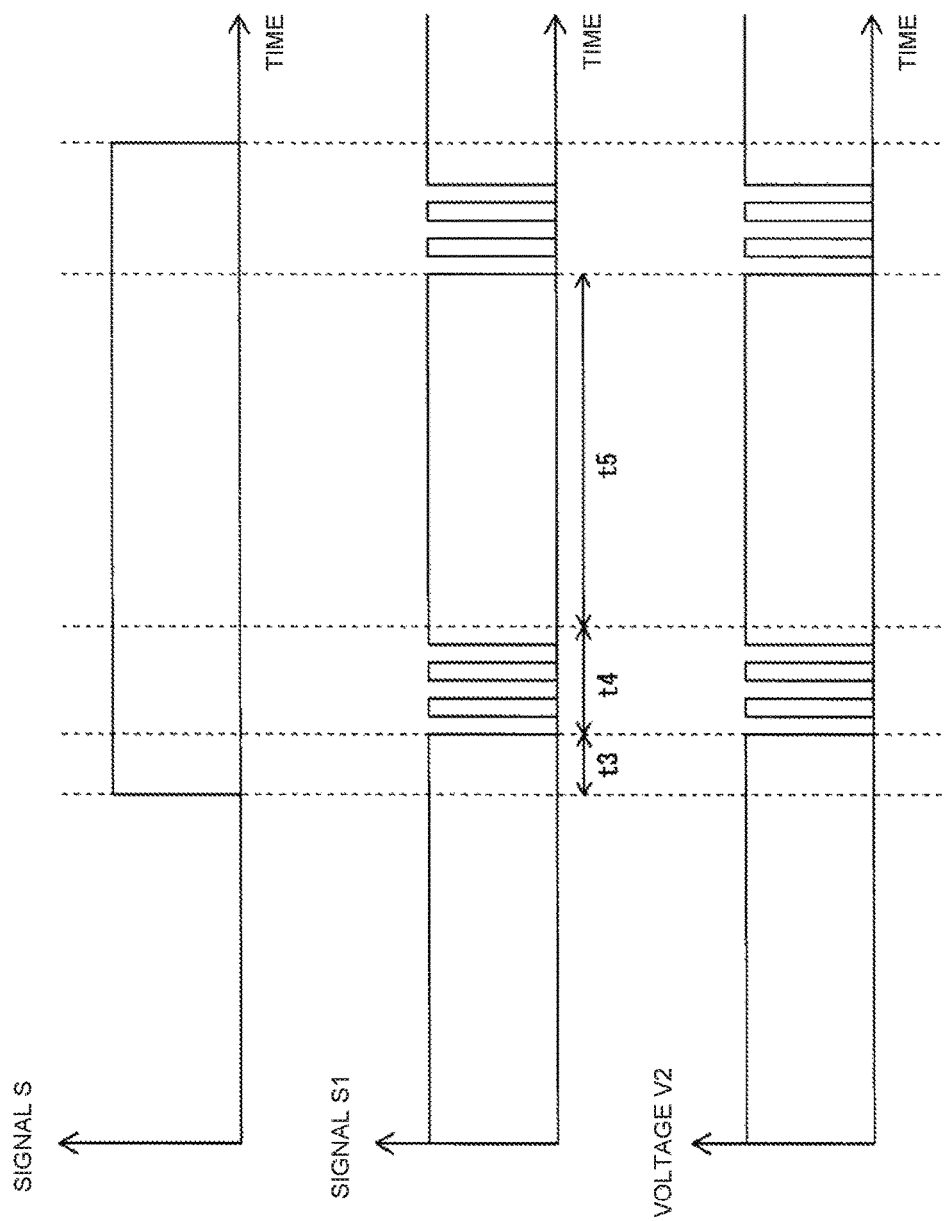
FIG. 4 shows graphs for explaining another example of control of the illumination apparatus in the illumination system in FIG. 1.

FIG. 4 shows graphs for explaining an example of control of the illumination apparatus 20 when the abnormality detection sensor is applied to the sensor device 30. Similarly to FIG. 3, the graphs of FIG. 4 show relationships of the signal S output from the sensor section 40, the signal S1 output from the control determination section 41, and the voltage V2 output from the sensor device 30.

As shown in FIG. 4, when the abnormality detection sensor is applied to the sensor device 30, the switch 32 is repeatedly turned on and off while an object (abnormality such as fire) is detected by the sensing unit 31, i.e., while the signal S is output. Thus, the illumination apparatus 20 may be caused to flicker by repeatedly turning the switch 32 on and off. The illumination apparatus 20 is flickered at an interval recognized by the human eye. The human in the place may immediately notice the occurrence of an abnormal situation such as fire by flickering of the illumination apparatus 20, thereby enabling urgent evacuation.

Specifically, when the sensor section 40 detects the abnormality such as fire, the signal S is output from the comparator (IC4) to the microcomputer (IC2) constituting the control determination section 41. The control determination section 41, when receiving the signal S, outputs the signal S1 intermittently. In other words, the output of the signal S1 is stopped at a predetermined interval to repeatedly turn the switch 32 on and off. Then, the photo MOS relay (IC1) repeatedly connects and disconnects the high potential side power source line 12A so that the voltage V2 is intermittently output to cause each illumination apparatus 20 to flicker. That is, when detecting the abnormality that is an object to be detected in the detection area, the sensor section 40 outputs the signal S to the control determination section 41. Then, when receiving the signal S, the control determination section 41 intermittently outputs the signal S1 as the detection signal to the switch 32. The switch 32 is in the on state while the switch 32 receives the signal S1.

In the example shown in FIG. 4, a waiting time period t3 is set which is a time period until the switch 32 starts to be turned on and off by the intermittent output of the signal S1 after the signal S is output. The waiting time period t3 is set to several tens of seconds to several minutes, for example. A time period t4 while the illumination apparatus 20 is caused to flicker is set to about one second to about five seconds, for example. The illumination apparatus 20 may be made to continuously flicker while the signal S is output, but preferably repeats the flickering state for the time period t4 and the lighting state for a time period t5 considering the safety and the like at the time of evacuation. The time period t5 is set to be longer than the time period t4, for example. The control determination section 41 may set the time period t4 (first predetermined time period) while the signal S1 is intermittently output and the time period t5 (second predetermined time period) while the signal S1 is continuously output and which is longer than the time period t4. The control determination section 41 alternately performs the intermittent output of the signal S1 based on the time period t4 and the continuous output of the signal S1 based on the time period t5 while the signal S is received.

Note that the example shown in FIG. 4 shows a case where the abnormality in the detection area is detected by the sensor section 40 in a state where the signal S1 is continuously output from the control determination section 41 to light the illumination apparatus 20. When the illumination apparatus 20 is turned off, the control determination section 41 performs the above flickering control after the control determination section 41 receives the signal S and outputs the signal S1 to turn on the switch 32, for example.

According to the illumination system 10 provided with the sensor device 30 as described above, the main power source lines 36 included in the main power source line 12 is connected or disconnected by turning the switch 32 on/off based on the detection signal of the sensing unit 31 (the signal S of the sensor section 40). The sensor device 30 incorporates the switch 32 provided in the main power source line 36, and controls supply or shut-off of the DC power to each illumination apparatus 20 based on the detection information of the sensing unit 31. That is, the sensor device 30 directly controls the plurality of illumination apparatuses 20 using the main power source line 12 based on the obtained detection information, and therefore the sensor device 30 does not need to transmit the detection information of the sensor device 30 to a master unit or the like using a radio unit or a signal line. Accordingly, the illumination system 10 can be provided at a low cost and with good workability.

Figure 5:
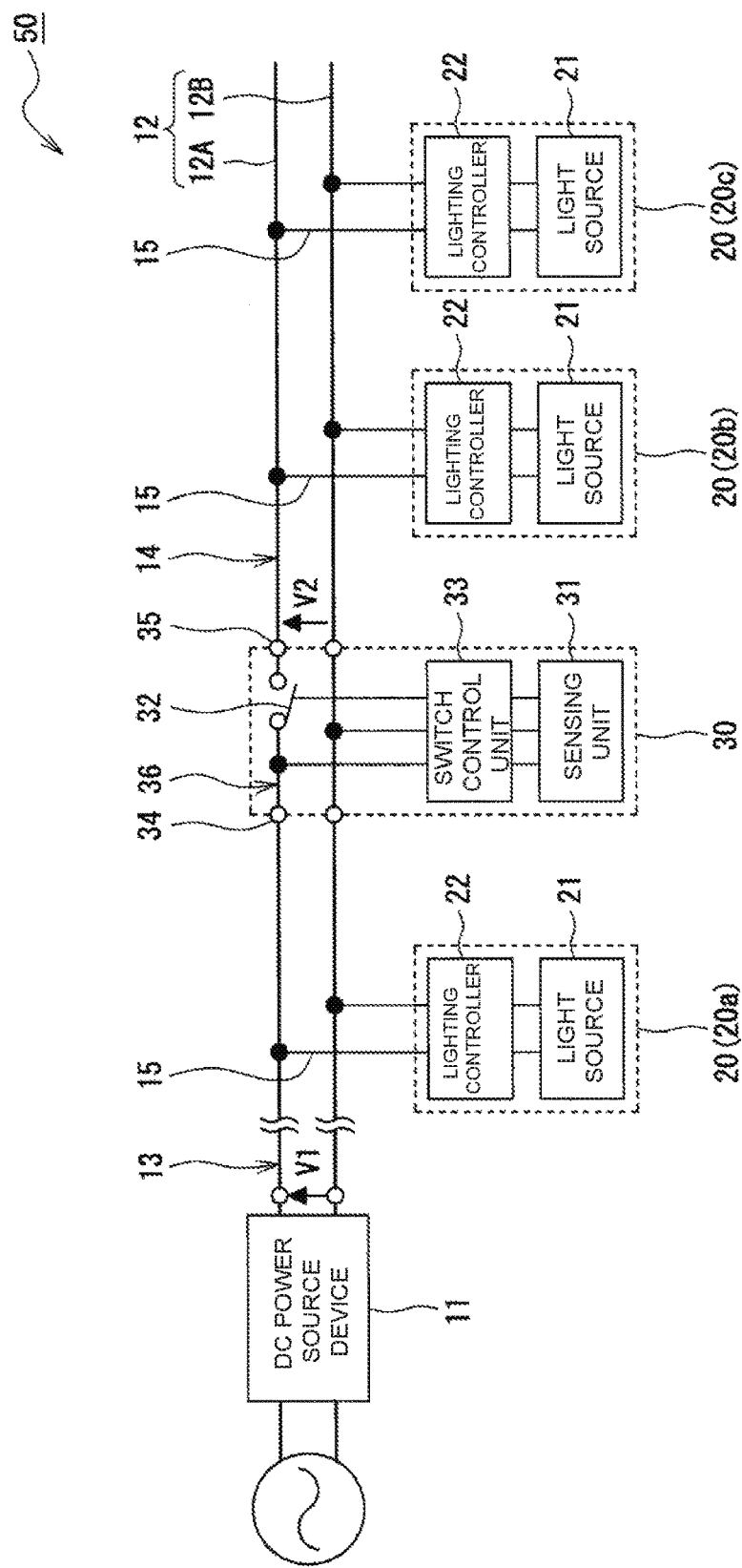
FIG. 5 is a block diagram showing an illumination system according to another example of the embodiments.
Figure 6:
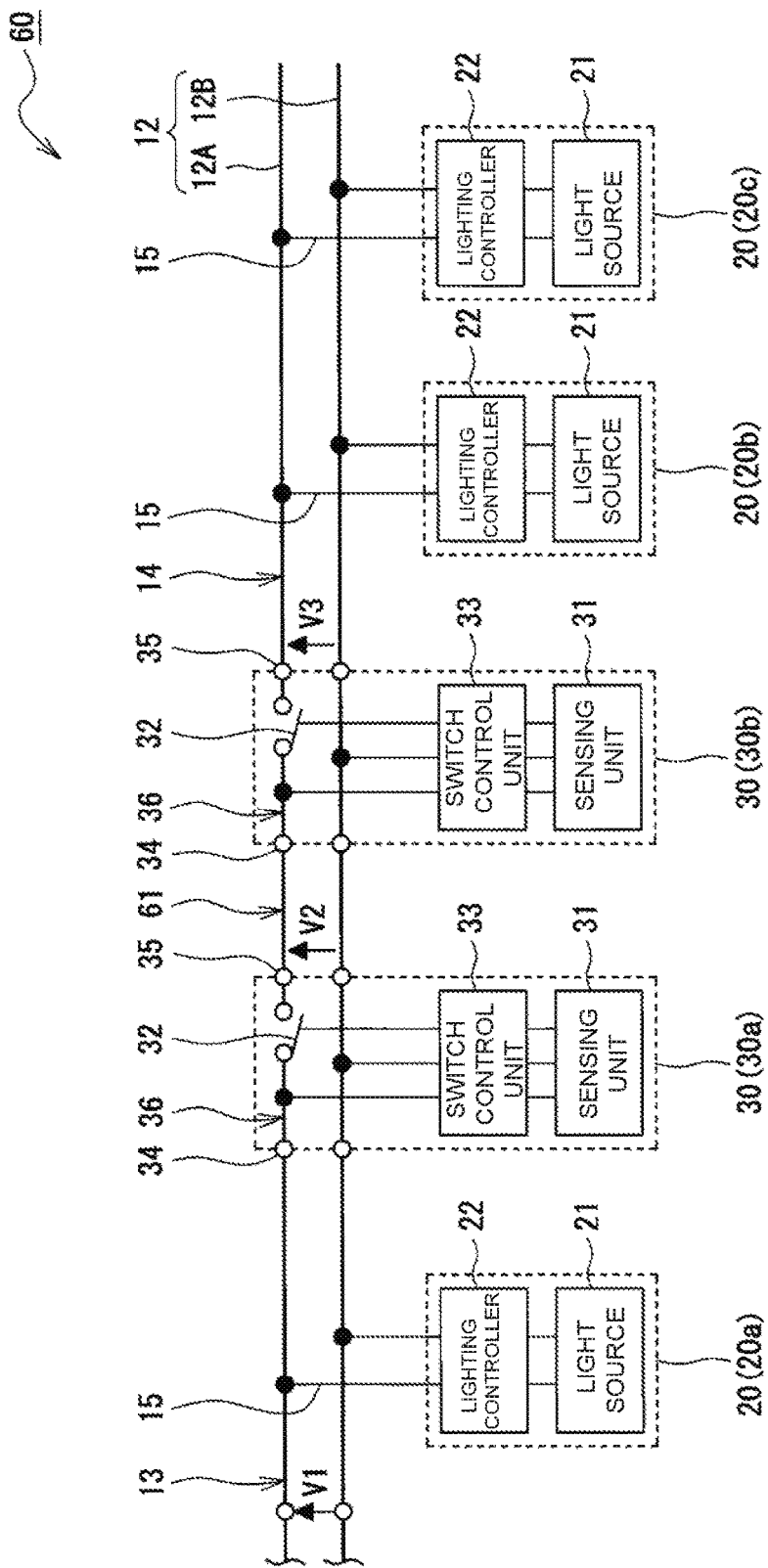
FIG. 6 is a block diagram showing an illumination system according to another example of the embodiments.
Figure 7:
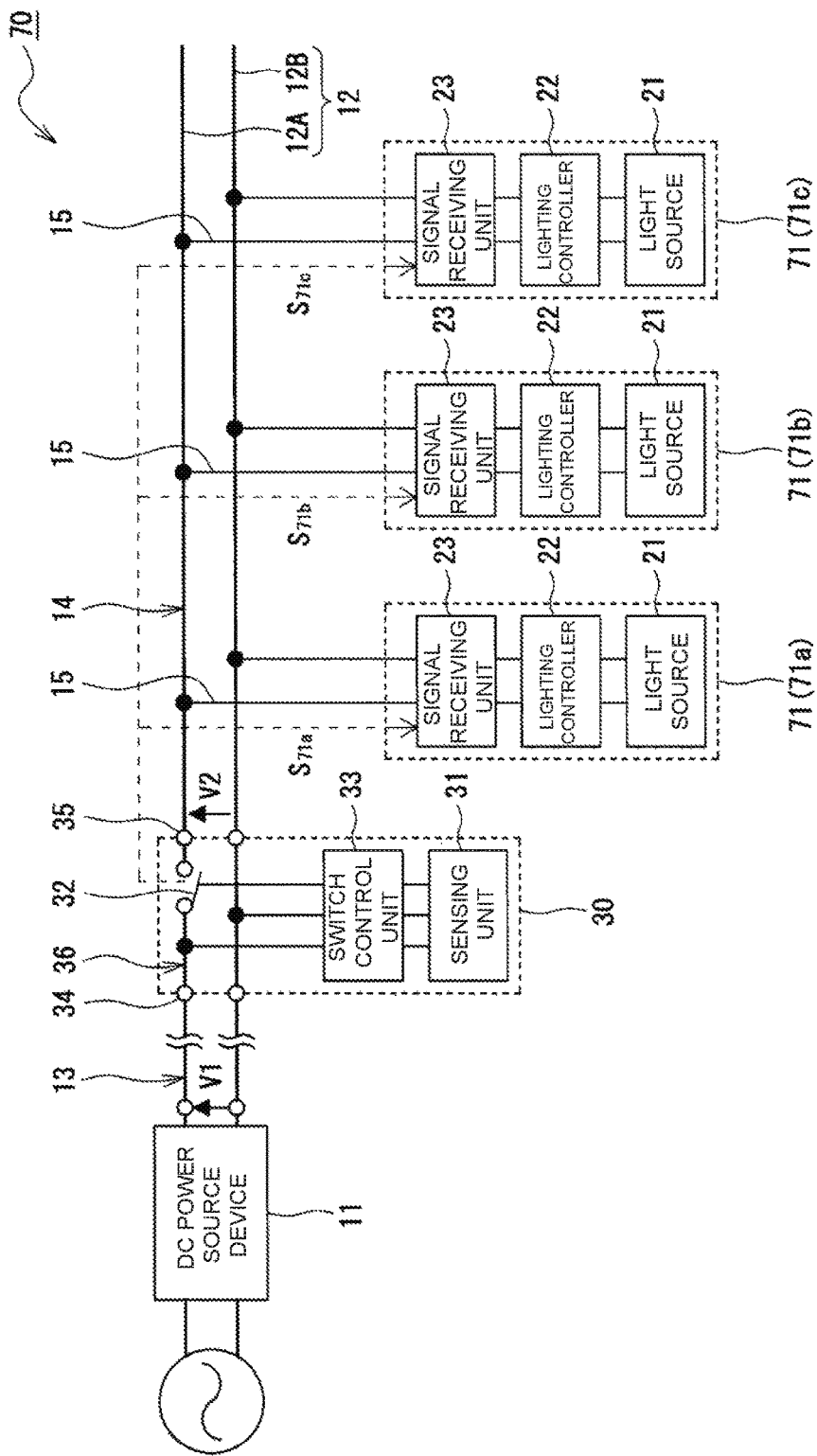
FIG. 7 is a block diagram showing an illumination system according to another example of the embodiments.

The above embodiment can be appropriately design-changed without impairing the object of the present disclosure. FIG. 5 to FIG. 7 are diagrams showing illumination systems 50, 60, 70 according to another example of the embodiment, respectively. FIG. 5 to FIG. 7 are block diagrams that correspond to FIG. 1. Hereinafter, the constituent elements similar to those in the embodiment described above are denoted by the same reference numerals, and redundant description thereof will be omitted.

The illumination system 50 illustrated in FIG. 5 includes the plurality of illumination apparatuses 20 and the one sensor device 30 in common with the illumination system 10. On the other hand, the illumination system 50 differs from the illumination system 10 in that one of the plurality of illumination apparatuses 20 is connected to the main power source 12 on the DC power source device 11 side rather than the sensor device 30. Here, the illumination apparatus 20 connected to the main power source line 13 is regarded as an "illumination apparatus 20a (first illumination apparatus)," and the illumination apparatuses 20 connected to the main power source line 14 is regarded as "illumination apparatuses 20b, 20c (second illumination apparatuses)."

In the illumination system 50, the illumination apparatuses 20b, 20c are controlled based on the detection information of the sensor device 30, but the illumination apparatus 20a to which the DC voltage V1 output from the DC power source device 11 is always applied is controlled independently from the sensor device 30. That is, the illumination apparatus 20a can be always lit regardless of whether the sensor device 30 detects an object or not, unless the supply of the power is shut off from the DC power source device 11. Such an illumination apparatus 20a is effective as a guide light, for example.

The illumination system 60 illustrated in FIG. 6 differs from the illumination system 10 in that two sensor devices 30 are provided. Here, one of the two sensor devices 30 that is connected to the main power source line 12 on the DC power source device 11 side is regarded as a "sensor device 30a," and the other of them is regarded as a "sensor device 30b." In the illumination system 60, the DC voltage V2 output from the sensor device 30a is applied to the sensor device 30b, and the DC voltage V3 output from the sensor device 30b is applied to the illumination apparatuses 20b, 20c. In this case, the illumination apparatuses 20b, 20c are controlled based on the detection information of the two sensor devices 30a, 30b.

The different types of sensor devices are used for the sensor devices 30a, 30b, respectively. For example, an abnormality detection sensor is applied to the sensor device 30a, and a human detection sensor is applied to the sensor device 30b. Alternatively, the human detection sensor may be used for the sensor device 30a, and an illuminance sensor may be used for the sensor device 30b. The sensor devices 30a, 30b are connected to each other through a main power source line 61 included in the main power source line 12, but the illumination apparatus 20 may be connected to the main power source line 61. In this case, the illumination apparatus 20 is controlled based on only the detection information of the sensor device 30a.

The illumination system 70 illustrated in FIG. 7 differs from the illumination system 10 in that a control signal is transmitted to a plurality of illumination apparatuses 71 connected to the main power source line 14 by turning the switch 32 of the sensor device 30 on and off so that each illumination apparatus 71 can be controlled based on the control signal. The illumination apparatus 71 has a similar configuration to the illumination apparatus 20 except that a signal receiving part 23 for receiving the control signal is provided. Here, the plurality of illumination apparatuses 71 connected to the main power source line 14 are regarded as "illumination apparatuses 71a, 71b, and 71c" in order from the sensor device 30 side.

In the illumination system 70, the sensor device 30 is configured to output the control signal based on the detection signal to each illumination apparatus 71 by a predetermined on/off operation of the switch 32 set in response to the detection signal of the sensing unit 31. That is, the control signal is generated by turning the switch 32 on and off. The sensor device 30 outputs a PWM signal corresponding to the detection signal to each illumination apparatus 71 using the main power source line 12 by turning the switch 32 on and off at high speed, for example. The off-time period of the switch 32 is set to several micro-seconds to several milli-seconds.

Specifically, when the signal S is output from the sensor section 40, the control determination section 41 intermittently outputs the signal S1 to turn the switch 32 on and off based on the signal S. Then, the MOSFET (Q3) of the switch drive section 43 is driven by the signal S1, and the control signal (PWM signal) superimposed on the DC voltage is transmitted to each illumination apparatus 71 by turning the photo MOS relay (IC1) constituting the switch 3 on and off at a high speed.

Each illumination apparatus 71 includes the signal receiving part 23 for reading the control signal superimposed on the DC voltage. The signal receiving part 23 transmits the read control signal to the constant current circuit of the lighting controller 22, and the constant current circuit controls the current flowing in the light source 21 based on the control signal. Thus, the light or color of the illumination apparatus 71 (light source 21) is adjusted based on the detection signal of the sensing unit 31. Note that the signal receiving part 23 may be configured as a part of the lighting controller 22.

The control signal output from the sensor device 30 may include specific information (address information) for identifying each of the illumination apparatuses 71a, 71b, and 71c. In this case, the sensor device 30 transmits the control signals $S_{71a}$, $S_{71b}$, $S_{71c}$ to the corresponding illumination apparatuses 71a, 71b, and 71c, respectively, so that the signal receiving part 23 of each illumination apparatus 71 acquires only a specific signal corresponding to each illumination apparatus 71. Thus, the light or color of only the specific illumination apparatus 71 can be adjusted based on the detection signal of the sensing unit 31, or only the specific illumination apparatus 71 can be lit, shut off or made to flicker. For example, while the illumination apparatus 71a is lit, the illumination apparatuses 71b and 71c can be made to flicker.

Note that as described above, the above control signal superimposed on the DC voltage is transmitted to the illumination apparatus 71, but the sensor device 30 may adjust the light or color of the illumination apparatus 71 by a predetermined on/off operation of the switch 32 set in response to the detection signal of the sensing unit 31. That is, an on-off duty cycle may be changed by continuing the on and off operation of the switch 32, so that the DC voltage V2 applied to the illumination apparatus 71 is changed to thereby adjust the light or color of the illumination apparatus 71.

REFERENCE SIGNS LIST 10, 50, 60, 70 illumination system
11 DC power source device
12, 13, 14, 36, 61 main power source line
12A high potential side power source line
12B low potential side power source line
15 branch wire
20, 71 illumination apparatus
21 light source
22 lighting controller
23 signal receiving part
30 sensor device
31 sensing unit
32 switch
33 switch control unit
34 first terminal
35 second terminal
40 sensor section
41 control determination section
42 control power source section
43 switch drive section

The invention claimed is:

1. A sensor device that is connected to a main power source line, of an illumination system, to which a DC voltage is applied, to which a DC power source device that outputs the DC voltage is connected, and to which at least one of an illumination apparatus is connected through a branch wire, the sensor device being connected to the main power source line in between where the DC power source device is connected to the main power source line and where at least one of the illumination apparatus is connected to the main power source line through the branch wire, and the sensor device comprising:
  an input-side terminal to which the main power source line is connected;
  an output-side terminal to which the main power source line is connected;
  a sensing unit that detects an object and outputs a detection signal;
  an in-device main power source line that connects the input-side terminal and the output-side terminal in the sensor device, and constitutes a part of the main power source line;
  a switch that is provided in the in-device main power source line and connects or disconnects the main power source line by an on-off operation;
  a first diode connected between the input-side terminal and the switch;
  a second diode connected between the output-side terminal and the switch;
  a control power source section that is connected to the main power source line through the first and the second diodes; and
  a switch device section on which the switch is mounted,
  wherein the switch is controlled to be turned on or off based on the detection signal, and
  the control power source section supplies a converted DC voltage converted from the DC voltage to the switch drive section and the sensing unit.

2. The sensor device according to claim 1, wherein the sensing unit includes a human detection sensor, and the switch is in an on state at least while the object is detected by the sensing unit.

3. The sensor device according to claim 2, wherein the sensing unit includes a sensor section and a control determination section,
  the sensor section outputs a first signal (S) to the control determination section when detecting a human that is the object in a detection area,
  the control determination section outputs a second signal (S1) as the detection signal to the switch when receiving the first signal (S), and
  the switch is in the on state while the switch receives the second signal (S1).

4. The sensor device according to claim 3, wherein the control determination section sets at least one of a shortest operation time period and a detection delay time period,
  wherein the shortest operation time period is a shortest time period required to continue an output of the second signal (S1) from an output start of the first signal (S), and
  the detection delay time period is a shortest time period required to continue the output of the second signal (S1) after the output of the first signal (S) is stopped.

5. The sensor device according to claim 1, wherein the sensing unit includes an abnormality detection sensor, and the switch is repeatedly turned on and off while the object is detected by the sensing unit.

6. The sensor device according to claim 5, wherein
the sensing unit includes a sensor section and a control determination section,
the sensor section outputs a first signal (S) to the control determination section when detecting an abnormality that is the object in a detection area,
the control determination section intermittently outputs a second signal as the detection signal to the switch when receiving the first signal (S), and
the switch is in the on state while the switch receives the second signal (S1).

7. The sensor device according to claim 6, wherein
the control determination section sets a first predetermined time period in which the second signal (S1) is intermittently output and a second predetermined time period in which the second signal (S1) is continuously output and which is longer than the first predetermined time period, and
the control determination section alternately performs an intermittent output of the second signal (S1) for the first predetermined time period and a continuous output of the second signal (S1) for the second predetermined time period while the first signal (S) is received.

8. An illumination system, comprising:
a DC power source device that outputs a DC voltage;
a main power source line to which the DC voltage is applied;
at least one of an illumination apparatus that is connected to the main power source line through a branch wire; and
a sensor device that is connected to the main power source line between the DC power source device and at least one of the illumination apparatus,
wherein the sensor device includes:
an input-side terminal to which the main power source line is connected;
an output-side terminal to which the main power source line is connected;
a sensing unit that detects an object and outputs a detection signal;
an in-device main power source line that connects the input-side terminal and the output-side terminal in the sensor device, and constitutes a part of the main power source line;
a switch that is provided in the in-device main power source line and connects or disconnects the main power source line by an on-off operation;
a first diode connected between the input-side terminal and the switch;
a second diode connected between the output-side terminal and the switch;
a control power source section that is connected to the main power source line through the first and the second diodes; and
a switch drive section on which the switch is mounted,
wherein the switch is controlled to be turned on or off based on the detection signal, and
the control power source section supplies a converted DC voltage converted from the DC voltage to the switch drive section and the sensing unit.

9. The illumination system according to claim 8, wherein
at least one of the illumination apparatus includes a plurality of illumination apparatuses each connected to the main power source line through a branch wire, and the sensor device is connected to the main power source line on the DC power source device side rather than at least one of the illumination apparatuses.

10. The illumination system according to claim 9, wherein
the main power source line includes a first main power source line that connects the DC power source device and the input-side terminal, and a second main power source line that is connected to the output-side terminal, and
the plurality of illumination apparatuses include a first illumination apparatus that is connected to the first main power source line, and a second illumination apparatus that is connected to the second main power source line.

11. The illumination system according to claim 8, wherein
the sensor device outputs a control signal based on the detection signal to the illumination apparatus by a predetermined on/off operation of the switch set in response to the detection signal,
the illumination apparatus includes a light source, a signal receiving part for receiving the control signal, and a lighting controller that controls a current flowing in the light source based on the control signal.

12. The illumination system according to claim 8, wherein
the sensing unit includes a human detection sensor, and
the switch is in an on state at least while the object is detected by the sensing unit.

13. The illumination system according to claim 12, wherein
the sensing unit includes a sensor section and a control determination section,
the sensor section outputs a first signal (S) to the control determination section when detecting a human that is the object in a detection area,
the control determination section outputs a second signal (S1) as the detection signal to the switch when receiving the first signal (S), and
the switch is in the on state while the switch receives the second signal (S1).

14. The illumination system according to claim 13, wherein
the control determination section sets at least one of a shortest operation time period which is a shortest time period required to continue an output of the second signal (S1) from an output start of the first signal (S) and a detection delay time period which is a shortest time period required to continue the output of the second signal (S1) after the output of the first signal (S) is stopped.

15. The illumination system according to claim 8, wherein
the sensing unit includes an abnormality detection sensor, and
the switch is repeatedly turned on and off while the object is detected by the sensing unit.

16. The illumination system according to claim 15, wherein
the sensing unit includes a sensor section and a control determination section,
the sensor section outputs a first signal (S) to the control determination section when detecting an abnormality that is the object in a detection area,
the control determination section intermittently outputs a second signal (S1) as the detection signal to the switch when receiving the first signal (S), and
the switch is in the on state while the switch receives the second signal (S1).

17. The illumination system according to claim 16, wherein the control determination section sets a first predetermined time period in which the second signal (S1) is intermittently output and a second predetermined time period in which the second signal (S1) is continuously output and which is longer than the first predetermined time period, and the control determination section alternately performs an intermittent output of the second signal (S1) for the first predetermined time period and a continuous output of the second signal (S1) for the second predetermined time period while the first signal (S) is received.

18. The illumination system according to claim 8, wherein a light or color of the illumination apparatus is adjusted by a predetermined on/off operation of the switch set in response to the detection signal, or a control signal is output to the illumination apparatus based on the detection signal.

\* \* \* \* \*